Patented Feb. 20, 1951

2,542,334

UNITED STATES PATENT OFFICE 2,542,334

CONDENSATION OF SILOXANES

James Franklin Hyde, Corning, N. Y., assignor to Corning Glass Works, Corning, N. Y., a corporation of New York No Drawing. Application April 24, 1946, Serial No. 664,702

4 Claims. (Cl. 260—46.5)

The present invention relates to the production of organosiloxane polymers from relatively low molecular weight linear type siloxanes.

The organosiloxanes with which this invention deals are materials which contain alternate silicon and oxygen atoms and which have organic radicals linked to the silicon atoms by carbon to silicon bonds. The organosiloxanes which are employed as the raw materials in this process are such as may be prepared by the hydrolysis of organosiloxanes containing functional groups, for instance chloride or ethoxy. Such hydrolyzates are in general composed of low molecular weight hydroxyl containing linear siloxanes and may contain also some cyclic organosiloxanes of low molecular weight.

As distinguished from the low molecular weight siloxanes which are the raw materials for the present process, and which are generally determinable chemical compounds, frequently in mixture, the polymeric products thereof are high molecular weight materials which are not determinable compounds. These polymeric products may be either liquids or gels, which in some instances are sufficiently stiff to have the aspect of solids. These products are of substantial importance as potting compounds and as intermediates in the production of stable fluids and high temperature greases and elastomers.

An object of the present invention is to provide methods for the condensation of relatively low molecular weight hydroxyl containing organosiloxanes with the production of organosiloxane high polymers.

In accordance with a preferred form of this invention, an hydroxyl containing organosiloxane having a molecular aggregation on the average of less than 50 organosilicon units per molecule is condensed by contacting it with an alkali metal hydroxide in amount up to 1 mol. of alkali metal hydroxide per 25 atoms of silicon.

The organosiloxanes to which the present invention is applicable contain predominately diorganosiloxane units. Limited amounts of monoorganosiloxane units and unsubstituted siloxane units may be present, though in any instance the degree of substitution is at least 1.3 organo radicals per silicon atom. In case siloxanes are polymerized which contain triorganosiloxane units, it is preferred that the degree of substitution be less than 2.01 organo radicals per silicon atom. It has been found that in this range of degree of substitution between 1.3 and 2.01 high polymers are obtained, under the condition herein defined, though it is to be noted that the dehydration of these materials need not proceed a priori to high polymers, inasmuch as the low molecular weight cyclic siloxanes are dehydration products likewise.

It has been indicated above that the hydrolyzates of hydrolyzable organosilicon compounds are suitable as starting materials for the present process. Other starting materials include the linear polydiorganosiloxane diols and the equivalent branch chain materials.

The cyclic organosiloxanes employed in accordance herewith may contain aryl radicals such as phenyl or tolyl, or alkyl radicals such as methyl to octadecyl. The organo radicals in these siloxanes are linked to the silicon atoms by carbon to silicon bonds. At least some of the organic radicals present are alkyl radicals, and it is preferred that at least about 60% of the silicon atoms present are substituted with at least one alkyl radical containing less than five carbon atoms. When larger proportions of diaryl siloxane units are present it appears that a portion thereof may not enter into the high polymer structure, and, when the entire reaction mixture is diaryl substituted, production of a high polymer of the character here involved is not effected by this method. This failure of the diarylsiloxanes to form high polymers may be a general phenomenon, independent of the method, inasmuch as 20 mers per molecule was the highest molecular weight diarylsiloxane reported by Kipping, who worked extensively with the diarylsiloxanes for many years.

These siloxanes, in accordance herewith are contacted with an alkali metal hydroxide. Sodium and potassium hydroxide are preferred due to the commercial availability thereof. Lithium hydroxide has been employed and, while it effects formation of high polymers, it is relatively sluggish. The alkali metal hydroxide is employed in amount up to one mol per 25 atoms of silicon. It appears that the alkali metal hydroxide initially interacts with a portion of the siloxane to form a salt. In fact, the alkali metal hydroxide may be initially reacted with a corresponding organosilicon compound in proportion to form an alkali metal salt of the organosilanol and the salt be then reacted with the siloxane in accordance herewith. The mechanism of the reaction from this point is uncertain. The reaction will proceed to the point that at least most of the material is condensed with the formation of high molecular weight products. To a considerable extent the amount of alkali present will be controlling of the molecular weight of the product. However, after the mixture apparently comes to equilibrium a disproportionation frequently occurs with the precipitation of material relatively rich in alkali metal. Precipitation in this manner results in increasing the viscosity of the residual siloxane. Very small amounts of alkali may be employed in the present process, and it has been found that alkali in amount less than sufficient to give a silicon to alkali metal atomic ratio of 10,000/1, is effective in rearranging siloxane bonds and effecting condensation to high polymers.

The process hereof is conducted at below the temperature at which destructive distillation would occur. The temperature accordingly is maintained below about 200° C. The temperature employed may be sufficiently elevated though, that organo radicals are removed from some of the silicon atoms. This results in a decrease in the degree of substitution which is frequently desirable in the production of gels. In any event the relative amount of dephenylation or dealkylation will not be great since under the conditions of reaction here employed, dehydration occurs very rapidly and in the initial stage of the condensation period. Following the dehydration no substantial amount of cleavage of carbon to silicon bonds occurs.

In some instances, in order to disperse the alkali metal hydroxide more rapidly, it is desirable either to heat the reaction mixture or to add a solvent. It appears probable that the higher rates with a solvent are the result of higher rates of dispersion rather than higher rates of reaction. The solvent may be either a polar solvent, such as water, alcohol or the like, or a non-polar solvent, such as benzene, toluene, dioxane or the like. When a solvent is employed to effect dispersion of the hydroxide, the amount added preferably is limited to not over about 15% and desirably not over 5% of the reaction mixture. Larger amounts of solvent effect dispersal but prevent formation of a high polymer and add to the amount to be evaporated. The presence of solvent limits the degree of polymerization of the product. When solvents are employed, and high viscosities are desired it is advantageous to reduce the solvent to not over 5% of the reaction mixture and preferably to eliminate the solvent to a substantial extent before the termination of the condensation.

In the production of gels by the present method, improvement in the physical properties of the gels obtained from the reaction mixture may be obtained by adding to the gel enough solvent, such as alcohol or toluene to give a mixture containing 5% to 15% solvent. With the alkali still present in the gel, this effects limited depolymerization of the gel. The solvent is then evaporated, whereby polymerization is again effected. The gels before and after treatment differ in properties.

The following examples are illustrative of the process of the present invention, and should not be considered as definitive of the scope thereof.

Example 1

Solid sodium hydroxide was added to a liquid low molecular weight phenyl ethyl siloxane of 412 centistokes obtained by hydrolyzing phenyl ethyl silicon dichloride in water. The sodium hydroxide was added in amount corresponding to one atom of sodium per 100 atoms of silicon. The mixture was held at a temperature of about 150° C. for several hours. The product had a viscosity of over 20,000 centistokes. After being neutralized and washed, the product was applied to glass fiber tape and heated in air at 200° C. for 8 hours, and at 250° for 5 hours. A resinous coating was produced which was tack-free and flexible.

Example 2

Solid sodium hydroxide was added to a liquid low molecular weight dibutyl siloxane of 77 centistokes obtained by hydrolyzing dibutyldiethoxysilane in water. The sodium hydroxide was added in amount corresponding to one atom of sodium per 25 atoms of silicon. The mixture was held at 150° C. for several hours. The viscosity had then increased to 230 centistokes.

Example 3

Solid sodium hydroxide was added to a liquid low molecular weight phenyl methyl siloxane of 332 centistokes obtained by hydrolyzing phenyl methyl silicon dichloride in water. The mixture was held at 150° C. until the viscosity appeared to attain a constant value. The alkali was then removed by neutralization and washing. The product had a viscosity of 1100 centistokes.

Example 4

A thin liquid polymer formed as the interaction product of cohydrolyzing a mixture of 1.8 parts of phenyl ethyl silicon dichloride and 1 part of ethyl silicon trichloride (molecular equivalent basis) was treated with solid sodium hydroxide in the manner described in the above examples. The sodium hydroxide was employed in amount equivalent to one atom of sodium per 100 atoms of silicon. The product, which was washed free of alkali, had greatly increased in viscosity, and possessed little flow at room temperature.

Example 5

A low molecular weight polymer, formed as the interaction product of cohydrolyzing a mixture 2 parts of phenyl ethyl silicon dichloride and 3 parts of methyltriethoxysilane (molecular equivalent basis), was treated with powdered sodium hydroxide in amount corresponding to 1 atom of sodium per 100 atoms of silicon. The reaction mixture was heated with stirring. Substantially all the alkali had dissolved at about 100° C. At 130° to 140° C. the mixture began to thicken. In about 15 minutes, the polymer went to a gel which was insoluble in toluene.

Example 6

A liquid dimethyl siloxane polymer containing residual hydroxyl groups, having an estimated average degree of polymerization of about 50 siloxane units per molecule, and having a viscosity of 75.6 centistokes was treated with sodium hydroxide in amount corresponding to 1 sodium atom per 40 silicon atoms. The sodium hydroxide was added as saturated aqueous solution. The mixture was stirred at room temperature for about two hours and then heated to between 80° and 180° C. for 2.5 to 3 hours with continuous stirring. The viscosity had then increased to 1400 centistokes.

Example 7

A low molecular weight dimethylsiloxane of 23 centistokes, prepared by hydrolyzing dimethyldiethoxysilane, was condensed under varying conditions. This hydrolyzate by analysis was shown to contain 13% of hydroxyl radicals.

A 50% aqueous potassium hydroxide solution was added to the hydrolyzate in amount corresponding to 1 atom of potassium per 100 atoms of silicon. The reaction mixture was maintained at 77° C. After 20 hours the viscosity had increased to 56.85 centistokes, and after 116 hours to 355.6 centistokes.

Powdered potassium hydroxide having a neutralization equivalent of 61.6 was added to a portion of the hydrolyzate in amount corresponding to 1 atom of potassium per 200 atoms of silicon. The temperature was maintained at 77° C. After 17 hours the viscosity was 685.2 centistokes and after 42 hours it was 1160 centistokes.

Powdered sodium hydroxide of 40.8 neutralization equivalent was added to two portions of the hydrolyzate, which were maintained at 77° C. One portion which contained 1 atom of sodium per 100 atoms of silicon attained a viscosity of 264.8 centistokes after 18 hours. The other portion which contained 1 atom of sodium per 443 atoms of silicon had a viscosity of 28.64 centistokes after 20 hours and 47.60 centistokes after 96 hours. Heating of these two portions to above 100° C. to drive off the water, produced from the hydroxyl groups, would result in considerable increases in the viscosities, in which case the portion containing the smaller amount of alkali would attain the higher viscosity.

Example 8

Phenyl methyl disiloxane diol, prepared by introducing the sodium salt thereof into an excess of dilute hydrochloric acid was condensed by mixing the diol containing a small proportion of ether with concentrated aqueous sodium hydroxide in amount equivalent to 1 atom of sodium per 150 atoms of silicon. Upon stirring the warm mixture, gellation occurred within five minutes.

This present application is in part a continuation of my copending application Serial No. 481,154 filed March 30, 1943, now abandoned.

I claim:

1. The method of preparing organosiloxane polymers which comprises contacting a solvent-free organopolysiloxane in which all of the organic radicals are selected from the group consisting of alkyl and monocyclic aryl radicals, in which siloxane there are between 1.3 and 2.01 organic radicals per silicon atom, of which organic radicals at least some are alkyl radicals, which polysiloxane has on the average a molecule aggregation of less than 50 siloxane units per molecule, and in which polysiloxane the remaining valences of the silicon atoms are satisfied by hydroxyl radicals, with an alkali metal hydroxide in amount from one atom of alkali metal per 10,000 atoms of silicon to one atom of alkali metal per 25 atoms of silicon until an increase in the viscosity of the polysiloxane is obtained, said polysiloxane and alkali metal hydroxide being maintained during contact at a temperature less than that at which destructive distillation would occur.

2. The method in accordance with claim 1 in which at least 60 per cent of the silicon atoms are substituted with at least one alkyl radical.

3. The method in accordance with claim 1 in which the organic radicals are methyl radicals.

4. The method in accordance with claim 1 in which the organic radicals are methyl and phenyl radicals.

JAMES FRANKLIN HYDE.

REFERENCES CITED

The following references are of record in the file of this patent:

UNITED STATES PATENTS

| Number | Name | Date |
|---|---|---|
| 2,371,068 | Rochow | Mar. 6, 1945 |
| 2,482,276 | Hyde et al. | Sept. 20, 1949 |

OTHER REFERENCES

Robison et al.: J. Chem. Soc., vol. 101, 1912, pp. 2156, 2163.